(12) United States Patent
Bergenholm et al.

(10) Patent No.: US 11,195,346 B2
(45) Date of Patent: Dec. 7, 2021

(54) ROBOTIC WORKING TOOL

(71) Applicant: HUSQVARNA AB, Husqvarna (SE)

(72) Inventors: Magnus Bergenholm, Flisby (SE); Johan Rogö, Habo (SE); Lars Ederfors, Bankeryd (SE)

(73) Assignee: Husqvarna AB, Huskvarna (SE)

(*) Notice: Subject to any disclaimer, the term of this patent is extended or adjusted under 35 U.S.C. 154(b) by 284 days.

(21) Appl. No.: 16/434,250

(22) Filed: Jun. 7, 2019

(65) Prior Publication Data
US 2019/0378360 A1  Dec. 12, 2019

(30) Foreign Application Priority Data
Jun. 7, 2018  (SE) .................... 1850689-9

(51) Int. Cl.
*G07C 5/02* (2006.01)
*G05D 1/00* (2006.01)
*G05D 1/02* (2020.01)

(52) U.S. Cl.
CPC ............. *G07C 5/02* (2013.01); *G05D 1/0088* (2013.01); *G05D 1/027* (2013.01); *G05D 2201/0208* (2013.01)

(58) Field of Classification Search
CPC ........ G07C 5/02; G05D 1/0088; G05D 1/027; G05D 2201/0208
See application file for complete search history.

(56) References Cited

U.S. PATENT DOCUMENTS 5,163,273 A * 11/1992 Wojtkowski ......... A01D 34/008
                                                    56/11.9
2011/0202175 A1    8/2011 Romanov et al.
2014/0371975 A1   12/2014 Biber et al.

FOREIGN PATENT DOCUMENTS

| EP | 3 160 035 A2 | 4/2017 |
| EP | 3 187 953 A1 | 7/2017 |
| WO | 2014/129941 A1 | 8/2014 |
| WO | 2016/087998 A2 | 6/2016 |

OTHER PUBLICATIONS

Search Report for Swedish Application No. 1850689-9 dated Jan. 22, 2019.

* cited by examiner

*Primary Examiner* — Michael D Lang
(74) *Attorney, Agent, or Firm* — Burr & Forman, LLP

(57) ABSTRACT

The present disclosure relates to an articulated self-propelled robotic tool 1 with first and second platforms 3, 7, each comprising a wheel set 5, 9 driven by motors. A link arrangement connects the first platform to the second platform at a turning axis 11. A driving error is determined by recording a driving input to the motors and a resulting movement parameter, comparing the resulting movement with an estimated resulting movement which is based on the driving input. Slip is detected using the driving error.

16 Claims, 3 Drawing Sheets

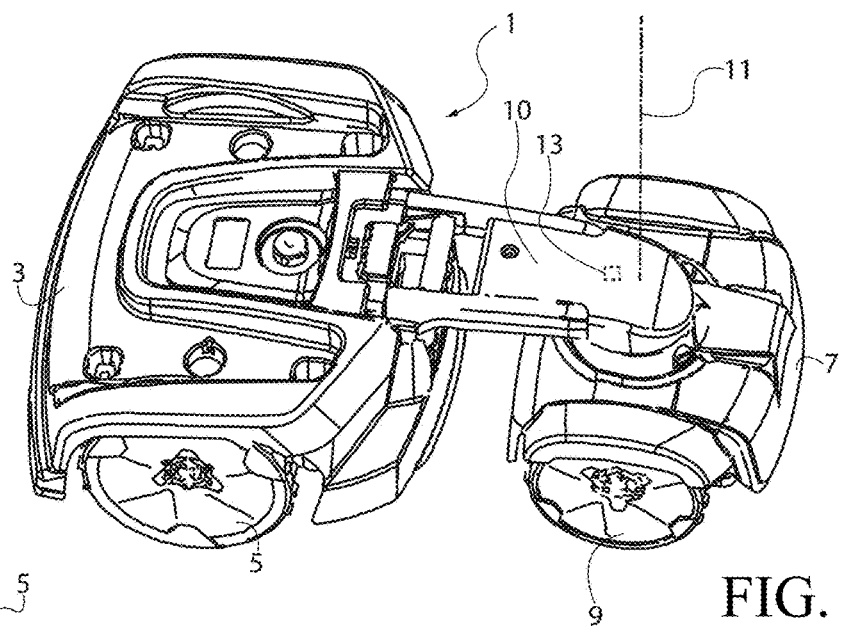
FIG. 1
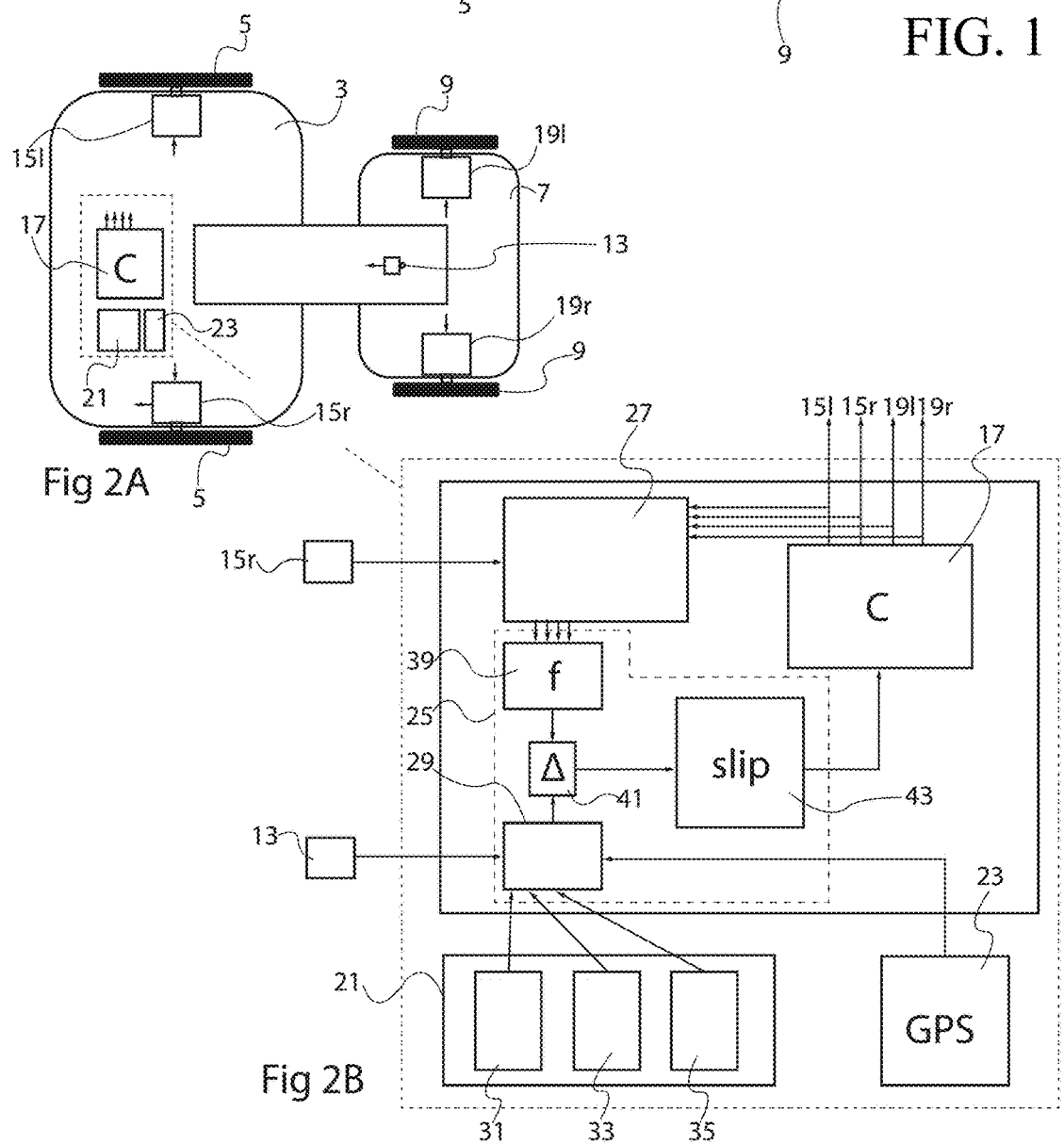
Fig 2A
Fig 2B

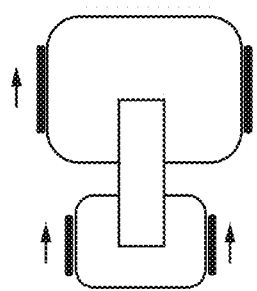
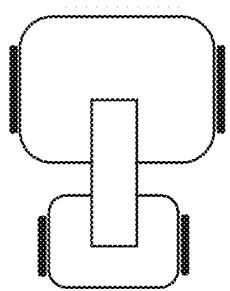
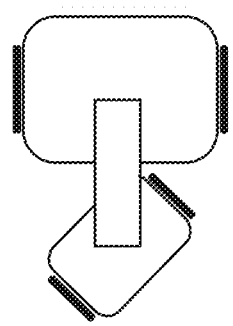
Fig 3A  Fig 3B  Fig 3C
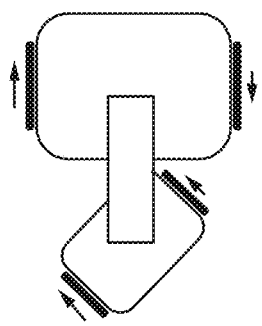
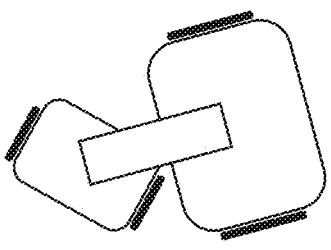
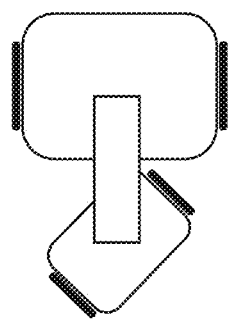
Fig 4A  Fig 4B  Fig 4C
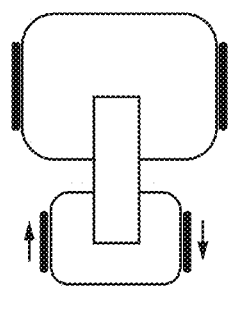
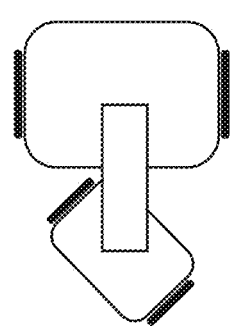
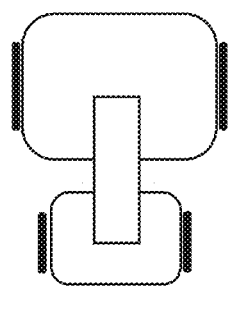
Fig 5A  Fig 5B  Fig 5C

ROBOTIC WORKING TOOL

TECHNICAL FIELD

The present disclosure relates to a self-propelled robotic tool. The self-propelled robotic tool is articulated and comprises a first platform, with a first wheel set driven by a first set of motors, and a second platform, with a second wheel set. A link arrangement connects the first platform to the second platform at a turning axis, such that one of said first and second platforms can be pivoted in relation to the other at said turning axis to an angular position.

BACKGROUND

One example of a self-propelled robotic tool is described in WO-2018/013045-A1 which shows an articulated robotic lawn mower. Articulated robotic tools have excellent driving abilities and can operate in difficult conditions. One problem associated with robotic tools of this kind is how to avoid excessive wear on the surface, for instance the lawn, on which they operate.

SUMMARY

One object of the present disclosure is therefore to provide a robotic tool that operates more smoothly. This object is achieved by means of a self-propelled robotic tool as defined in claim 1. More specifically, in a robotic tool of the initially mentioned kind, there is provided a slip detection arrangement configured to record a driving input to the first set of motors, record at least one resulting movement parameter correlated to movement of the first wheel set, determine a driving error by: determining either an estimated resulting movement parameter based on the recorded driving input, and comparing the estimated resulting movement parameter with a recorded resulting movement parameter to provide the driving error, or determining an estimated driving input based on the recorded resulting movement parameter and comparing the estimated driving input with the recorded driving input to provide the driving error, and detect slip based on the driving error.

Thanks to this slip detection arrangement, the robotic tool can detect when a wheel begins to slip e.g. on a lawn and can adjust its driving to prevent further slip. This reduces wear on the surface on which the robotic tool operates.

The second wheel assembly may be driven by a second set of motors, and the slip detection arrangement may be configured to record a driving input to the second set of motors and to base the slip detection also on the driving input to the second set of motors. This provides an even more exact detection of slip.

The resulting movement parameter may include a detected angle between the first and second platform. This provides data useful for slip detection.

The resulting movement parameter may further include data from an inertia measurement unit, IMU, such as data from an accelerometer, a gyro, or an electronic compass.

The resulting movement parameter may further include data from a positioning system.

The robotic tool may be configured to carry out a slip elimination procedure in case a slip exceeding a slip threshold is detected.

Typically, the self-propelled robotic tool is a robotic lawnmower.

The present disclosure also considers a corresponding method in a self-propelled articulated robotic tool for detecting wheel slip. Such a method generally includes steps carrying out the actions of the corresponding robotic tools functional units.

BRIEF DESCRIPTION OF THE DRAWINGS

FIG. 1 shows a perspective view of a robotic working tool in the form of an articulated robotic mower.

FIGS. 2A and 2B illustrates schematically components of a robotic working tool.

FIGS. 3A-C, 4A-C, and 5A-C illustrate detection of slip in different scenarios.

DETAILED DESCRIPTION

Figure 6:
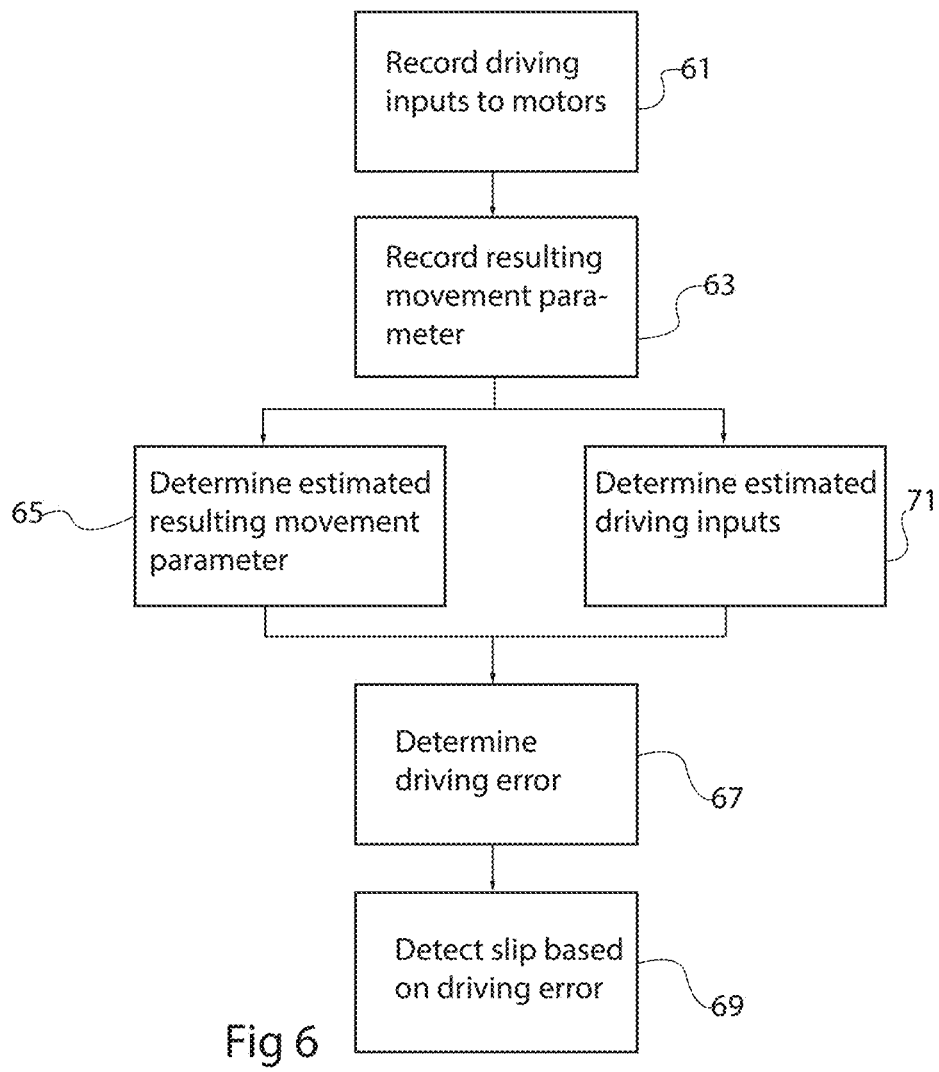
FIG. 6 illustrates a flow chart of general slip detection method.

The present disclosure relates to a robotic working tool, an example of which is shown in FIG. 1. The illustrated robotic working tool 1, is an articulated lawn mower having a first 3 and a second 7 platform, which are interconnected with a link arrangement 10. The first platform 3 has a first set of wheels 5, and the second platform 7 has a second set of wheels 9, one wheel being visible on each platform in FIG. 1. The working tool is articulate in such a way that one of the first and second platforms 3, 7 can be pivoted in relation to the other about the turning axis 11 to an angular position, which may be detected by means of a goniometer 13.

Such an articulated lawn mower has superior maneuverability compared to a single-platform robot and is capable of operating in rougher terrain.

FIG. 2A illustrates schematically the robotic working tool and basic components therein. The first set of wheels 5 is driven by a first set of motors 15 controlled by a control unit 17, for instance providing controlled motor currents to each motor, although other control mechanisms are possible, such as providing control pulses to stepping motors. In the illustrated case, the motors however are brushless DC motors controlled with applied motor currents. Although a two-wheel drive lawn mower could be considered, it is advantageous to provide a set of motors 19 driving the second set of wheels 9 as well. Then all wheels can be controlled individually.

The control unit 17 is therefore capable of moving the robotic working tool over an operation area e.g. to mow grass, and this may be carried out based on e.g. inertia measurement unit, IMU, 21 data or a positioning data device 23 based on GPS or RTK, real time kinematics, data, for instance. For robotic lawn mowers it is further common to stay within a defined working area by detecting a boundary loop wire buried at the outer boundaries of the working area.

Turning the wheels 5, 9 will in most cases make the robotic working tool move and will in many cases further make one platform 7 pivot with respect to the other 3 in order to control the movement path of the robotic tool.

Under some circumstances wheels may begin to slip when driven in this way. This may be due to high driving resistance e.g. caused by tough grass or an obstacle or because of low friction between the wheel and the surface, typically a lawn, on which the robotic working tool runs. Wheel slip should be avoided if possible, as it may cause for instance excessive wear on a lawn. This can in most cases be done by driving the wheels differently, but measures carried out to reduce or avoid slip efficiently requires that the slip is detected.

The present disclosure relates to an arrangement for detecting slip in such an arrangement, as well as a method for detection slip in a robotic working tool 1 of this kind. FIG. 2B illustrates schematically components of a robotic working tool for detecting slip in the form of a slip detection arrangement 25.

Typically, the slip detection arrangement 25 is integrated with the control unit 17 and may in many cases be software-implemented as routines carried out in the control unit. Nevertheless, to explain the function of the slip detection arrangement, it is convenient to describe some functional blocks carrying out actions that the slip detection arrangement is configured to execute.

Generally, the slip detection arrangement compares the driving of the motors with the resulting movement of the first and second platforms 3, 7 to determine if slip takes place. If the platforms do not move as expected, this may be due to slip.

There is therefore provided a driving recording block 27 that records the movement of the wheels 5, 9. This may be done by recording driving signals sent to the motors, such as driving currents 15*l*, 15*r*, 19*l*, 19*r*. Alternatively, as indicated for one wheel's motor (15*r*) there may be provided a sensor at each wheel that records that wheel's movement and provides a sensor signal that is fed back to the driving recording block 27. This corresponds to a first step 61 in a corresponding method (cf. FIG. 6) where driving inputs to at least a first set of motors are recorded directly or indirectly.

At the same time, returning to FIG. 2B, a movement recording block 29 records at least one resulting movement parameter correlated to movement of the wheels. This may be done in different ways.

In a first arrangement, the sensor output from the goniometer 13, measuring the relative angle between the first and second platforms 3, 7 may be used. If neither of the wheels experience slip, this angle will change in a predictable way (or not change at all) in response to the wheel movements.

Alternatively, or combined therewith, data from an inertia measurement unit, IMU, 21 may be used. Such units are used for navigation of the robotic tool e.g. to cover a working area, but data produced could also be used also for slip detection. An IMU 21 may include accelerometers 31, gyroscopes 33, and an electronic compass 35 e.g. providing roll-, pitch-, and yaw outputs. All these sensors may provide data corresponding to movement of the robotic work tool or parts thereof.

Further, navigation sensors 23 such as GPS-, Global Positioning System, or RTK-, real time kinematics sensors (the latter being based on GPS as well) could be used. Note that there are other conceivable positioning systems in this context, such as positioning based on a buried boundary wire.

Some of those sensor signals or combinations thereof may be fed to the movement recording block 29. It should be noted that for instance the goniometer 13 signal alone could be used.

The above recording of the movement recording block corresponds to the second step 63 in the method (cf. FIG. 6) where at least one resulting movement parameter correlated to movement of the first set is recorded.

Returning again to FIG. 2B, there is determined, based on recorded driving input, an estimated resulting movement parameter using an estimation block 39. For instance, it may be determined that the recorded driving input should result in a specific angle between the first and second platforms 3, 7. Alternatively, or combined therewith, it may be decided that a for instance certain accelerometer 31 output should result from the wheel movement.

This could be done with a mathematical function, as the geometry of the robotic tool is well known. Alternatively, a multi-dimensional lookup table may be provided, e.g. by experimenting, that for e.g. a given set of wheel movements outputs a corresponding accelerometer response, for instance. In general, this function corresponds to the step 65 in the method (cf. FIG. 6)

The estimated resulting movement parameter is compared with the actual recorded resulting movement parameter in a comparator block 41 to provide a driving error Δ. The driving error Δ is used to detect slip in a detection block 43. This detection may in a simple case correspond to detecting that an error exceeds a threshold. However, the driving error may be multi-dimensional and different components thereof may be combined with different thresholds, for instance, in order to determine that a slip takes place. This corresponds to the step 69 of the method (cf. FIG. 6) where slip is detected based on the driving error.

If a slip is detected, the detection block 43 may report the detected slip to the control unit 17, such that the latter can influence its control procedures to reduce or eliminate the slip. For instance, the robotic working tool can reverse and subsequently attempt a slightly different driving direction (e.g. avoiding an obstacle causing the slip). Alternatively, a slightly less powerful driving procedure can be carried out (e.g. driving less aggressively on wet grass).

Figure 7:
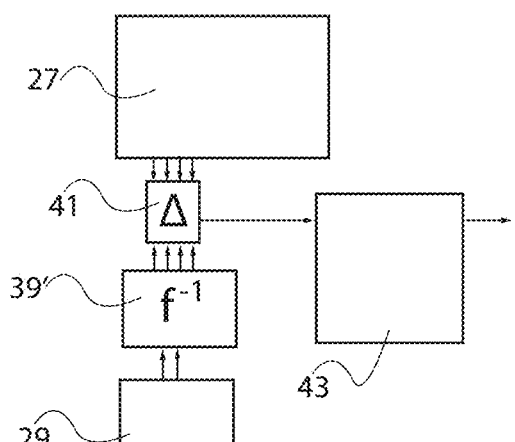
FIG. 7 illustrates an alternative embodiment of the slip detection arrangement.

In an alternative embodiment illustrated in FIG. 7, there is instead determined an estimated driving input based on the recorded resulting movement parameter thus an 'inverse' version 39' of the estimation block can be used to estimate the driving input that would have resulted in the recorded resulting movement parameter under no-slip conditions. This is compared with recorded actual driving input to provide the driving error, which may then be used in a similar way as described before. This corresponds to the alternative determining step 71 of FIG. 7 where an estimated driving input is determined based on the recorded resulting movement parameter to determine the driving error.

FIGS. 3A-C, 4A-C, and 5A-C, illustrate detection of slip in different scenarios.

In FIG. 3A the first and second platforms are lined up straight and all four wheels are given the same driving input. It is then expected that the angular relationship between the first and second platform should be maintained as shown in FIG. 3B.

If an unexpected angular displacement between the first and second platforms takes place, as illustrated in FIG. 3C, it can be assumed that slip takes place.

In FIG. 4A the first and second platforms are angled, and the wheels are given the driving inputs to carry out a right turn. It is then expected that a turn takes place as shown in FIG. 4B and as should be detected with a gyroscope sensor.

If the expected turn does not occur, as illustrated in FIG. 4C, it can be assumed that slip takes place.

In FIG. 5A the first and second platforms are lined up straight and the wheels of the second platform are given opposite driving inputs. It is then expected that the angular relationship between the first and second platform is changed as shown in FIG. 5B.

If the expected angular displacement between the first and second platforms does not occur, as illustrated in FIG. 5C, it can be assumed that slip takes place.

The present disclosure is not limited to the above-described examples and may be varied and altered in different ways within the scope of the appended claims.

The invention claimed is:

1. An articulated self-propelled robotic tool comprising a first platform with a first wheel set driven by a first set of motors, a second platform with a second wheel set, and a link arrangement connecting the first platform to the second platform at a turning axis, such that one of said first and second platforms are pivotable in relation to the other at said turning axis to an angular position, characterized by a slip detection arrangement configured to:
record a driving input to the first set of motors,
record at least one resulting movement parameter correlated to movement of the first wheel set,
determine a driving error by:
determining an estimated resulting movement parameter based on recorded driving input, and comparing the estimated resulting movement parameter with a recorded resulting movement parameter to provide the driving error, or
determining estimated driving input based on the recorded resulting movement parameter and comparing the estimated driving input with the recorded driving input to provide the driving error, and
detect slip based on the driving error.

2. The self-propelled robotic tool according to claim 1, wherein the second wheel assembly is driven by a second set of motors, and the slip detection arrangement is configured to record a driving input to the second set of motors and base the slip detection also on the driving input to the second set of motors.

3. A self-propelled robotic tool, comprising:
a first platform with a first wheel set driven by a first set of motors;
a second platform with a second wheel set and
a link arrangement connecting the first platform to the second platform at a turning axis, such that one of said first and second platforms are pivotable in relation to the other at said turning axis to an angular position, characterized by a slip detection arrangement configured to:
record a driving input to the first set of motors,
record at least one resulting movement parameter correlated to movement of the first wheel set,
determine a driving error by:
determining an estimated resulting movement parameter based on recorded driving input, and comparing the estimated resulting movement parameter with a recorded resulting movement parameter to provide the driving error, or
determining estimated driving input based on the recorded resulting movement parameter and comparing the estimated driving input with the recorded driving input to provide the driving error, and
detect slip based on the driving error,
wherein said at least one resulting movement parameter includes a detected angle between the first and second platforms.

4. The self-propelled robotic tool according to claim 1, wherein said at least one resulting movement parameter includes data from an inertia measurement unit.

5. The self-propelled robotic tool according to claim 4, wherein said data from the inertia measurement unit includes at least one of data from an accelerometer, a gyro, or an electronic compass.

6. The self-propelled robotic tool according to claim 1, wherein said at least one resulting movement parameter includes data from a positioning system.

7. The self-propelled robotic tool according to claim 1, wherein the robotic tool is configured to carry out a slip elimination procedure in case a slip exceeding a slip threshold is detected.

8. The self-propelled robotic tool according to claim 1, wherein the self-propelled robotic tool is a robotic lawnmower.

9. A method in a self-propelled robotic tool for detecting wheel slip, the self-propelled robotic tool being articulated and comprising a first platform with a first wheel assembly driven by a first set of motors, a second platform with a second wheel assembly, a link arrangement connecting the first platform to the second platform at a turning axis, such that one of said first and second platforms are pivotable in relation to the other at said turning axis to an angular position, the method comprising:
recording a driving input to the first set of motors,
recording at least one resulting movement parameter correlated to movement of the first wheel assembly,
determining a driving error by:
determining an estimated resulting movement parameter based on recorded driving input, and comparing the estimated resulting movement parameter with a recorded resulting movement parameter to provide the driving error, or
determining an estimated driving input based on the recorded resulting movement parameter and comparing the estimated driving input with recorded driving input to provide the driving error, and
detecting slip based on the driving error.

10. The method according to claim 9, wherein the second wheel assembly is driven by a second set of motors, and the slip detection method records a driving input to the second set of motors and bases the slip detection also on the driving input to the second set of motors.

11. The method according to claim 9, wherein said at least one resulting movement parameter includes a detected angle between the first and second platform.

12. The method according to claim 9, wherein said at least one resulting movement parameter includes data from an inertia measurement unit (IMU).

13. The method according to claim 12, wherein said data from the IMU includes at least one of data from an accelerometer, a gyro, or an electronic compass.

14. The method according to claim 9, wherein said at least one resulting movement parameter includes data from a positioning system.

15. The method according to claim 9, wherein the robotic tool is configured to carry out a slip elimination procedure in case a slip exceeding a slip threshold is detected.

16. The method according to claim 9, wherein the self-propelled robotic tool is a robotic lawnmower.

* * * * *